Nov. 12, 1957  C. LAVAL, JR  2,812,697
STEPPED PROGRESSION BOREHOLE CAMERA APPARATUS
Filed Dec. 1, 1953  3 Sheets-Sheet 2
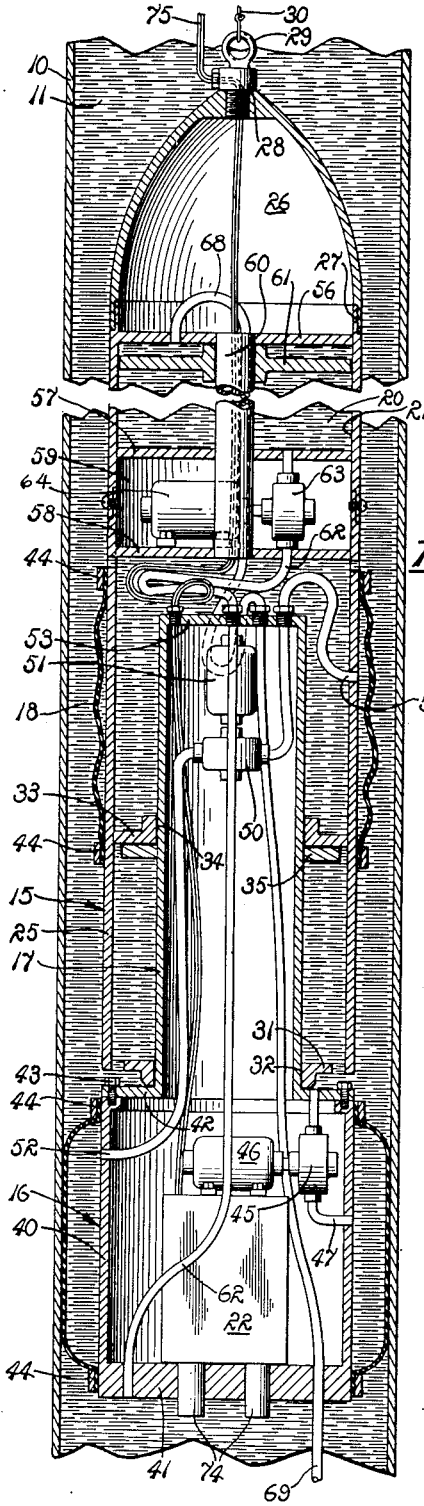
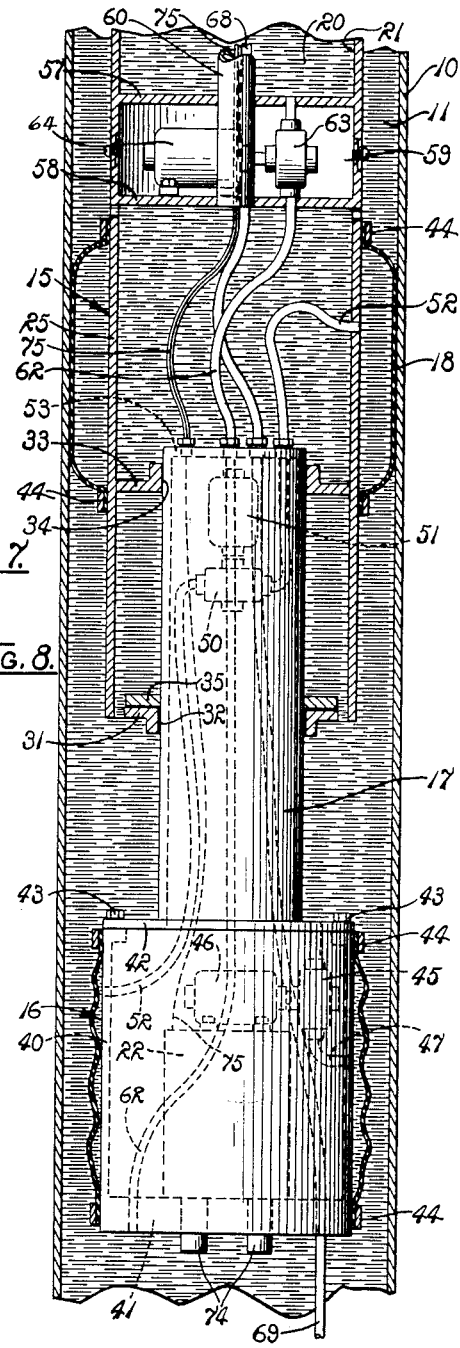
FIG. 7.
FIG. 8.
CLAUDE LAVAL, JR.
INVENTOR
HUEBNER, BEEHLER, WORREL & HERZIG
ATTORNEYS
BY Nov. 12, 1957 C. LAVAL, JR 2,812,697
STEPPED PROGRESSION BOREHOLE CAMERA APPARATUS
Filed Dec. 1, 1953 3 Sheets-Sheet 3

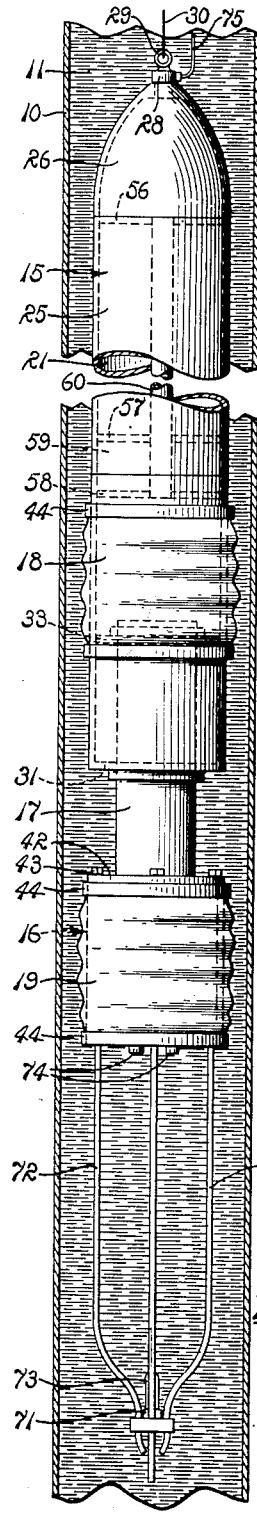

CLAUDE LAVAL, JR.
INVENTOR
HUEBNER, BEEHLER,
WORREL & HERZIG
ATTORNEYS
BY

United States Patent Office 2,812,697
Patented Nov. 12, 1957

2,812,697
STEPPED PROGRESSION BOREHOLE CAMERA APPARATUS

Claude Laval, Jr., Fresno, Calif.

Application December 1, 1953, Serial No. 395,437

22 Claims. (Cl. 95—11)

The present invention relates to borehole camera apparatus and more particularly to such a device suited to stepped progression longitudinally of wells, pipes, and similar operational environments which, for purposes of convenience, are referred to as boreholes.

Although for descriptive simplicity the submersible camera of the instant invention is described in terms of photographing bore holes and the like, as well as objects contained therein, it is to be understood that it is not limited to such precise method of investigation or inspection but may as conveniently embody facilities for televising or otherwise transmitting viewable images from such boreholes to positions remote therefrom. Thus "camera" as employed herein is intended to comprehend photographic cameras, television cameras, and other means suitable to the purpose of registering an image for transmission or conveyance to a remote point of inspection. In this and several other respects the present invention is similar to the borehole camera apparatus constituting the subject matter of my copending United States patent application filed November 19, 1951, Serial No. 257,107 which issued May 11, 1954, as Patent No. 2,677,966.

The borehole camera apparatus of my identified copending application made provision for the visual inspection of boreholes below the surface of transparent, translucene and/or opaque fluids contained therein such as water, oil, drilling mud, and the like. It had been previously considered possible to photograph only in "dry" wells and that photographic investigation below the surfaces of opaque or translucent liquids which were frequently viscous in nature was entirely impractical. The previous invention made possible the localized substitution of transparent fluids for semi-transparent, translucent or opaque fluids even at extreme depths and at other locations of difficult access and the retention of the transparent fluids in an area of inspection for a period sufficient for the purpose.

A primary object of the present invention is to increase the mobility of the previous borehole camera apparatus so that successive pictures can be made at selected intervals of advancement longitudinally of a borehole without significant loss of the transparent replacement fluid provided for accurate light transmission therethrough. While it is to be understood that the previous borehole camera apparatus possessed a considerable degree of mobility such mobility was frequently attained at the sacrifice in available transparent fluids which on extended or frequent movement escaped control. Such escape was progressive in nature and resulted in a comparable progressive restriction of the viewable area requiring withdrawal of the apparatus in order to replenish the supply of transparent fluid.

Another object is to provide a camera apparatus untilizing the fluid replacement principle as an aid to the visual inspection of boreholes adapted for controlled progression longitudinally of boreholes and the like.

Another object is to provide a stepped progression camera apparatus suited to the production of visual images in controlled sequential arrangement in boreholes.

Another object is to provide a stepped progression camera apparatus of the character described accurately controllable from positions remote therefrom.

Another object is to provide a remotely controlled stepped progression camera apparatus requiring a minimum of controlling connections thereto.

Other objects are to provide improved elements and arrangements thereof in a device of the character and for the purposes set forth that is dependable, durable, comparatively economical, and fully effective in accomplishing its intended purposes.

Further objects and advantages will become apparent in the subsequent description in the specification.

Referring to the drawings:

Fig. 1 is a vertical section through a well casing and well liquid therein showing in elevation a submersible stepped progression camera apparatus of the present invention suspended therein. A section of the apparatus and the casing are omitted to shorten the illustration.

Fig. 2 is a slightly enlarged vertical section of the well, similar to Fig. 1, but showing the camera apparatus also in section.

Fig. 3 is a horizontal section through the well casing and the photographic device, taken at the position indicated by line 3—3 in Fig. 2 of the drawings.

Figs. 4, 5 and 6 are horizontal sections similar to Fig. 3, as viewed from positions indicated by lines 4—4, 5—5 and 6—6, respectively in Fig. 2 of the drawings.

Fig. 7 is a further enlarged section similar to Fig. 2 with the photographic device in a successive position of its stepped progression along the well casing.

Fig. 8 is a similar view of the structure of the lower portion of Fig. 7 but with a lower housing and its cylindrical extension in elevation and with the photographic device in a successive position of its stepped progression in the well casing.

Figure 9:
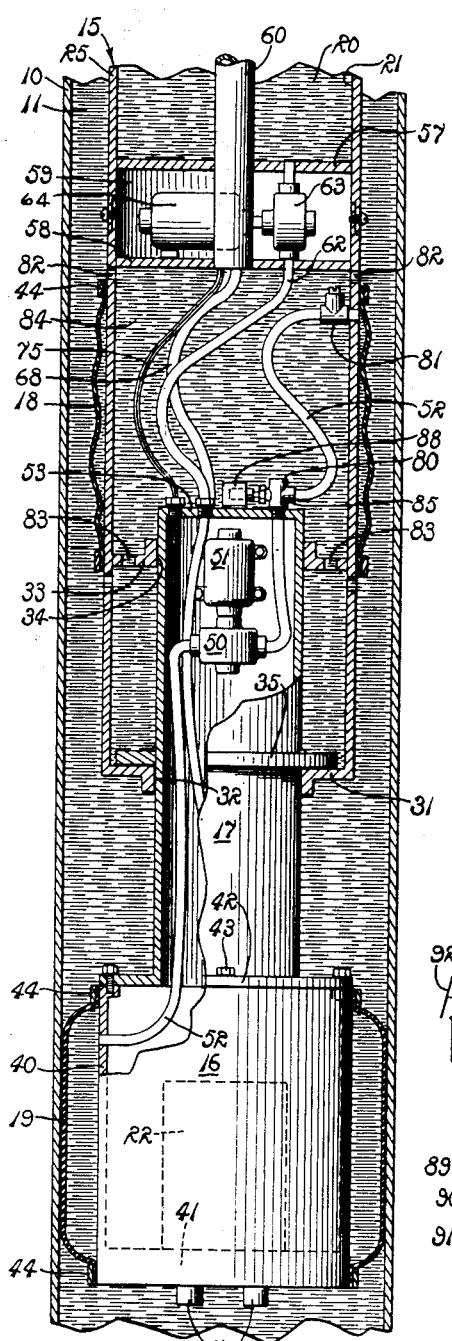

Fig. 9 is a fragmentary vertical section somewhat similar to Fig. 7 but showing a second form of the invention.

Figure 10:
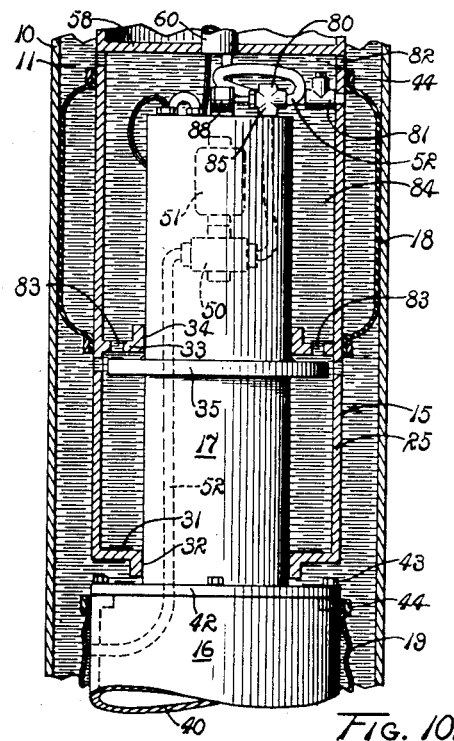

Fig. 10 is a fragmentary vertical section somewhat similar to Fig. 8 but showing only a central portion of the second form of the invention in an operational step following that shown in Fig. 9.

Figure 11:
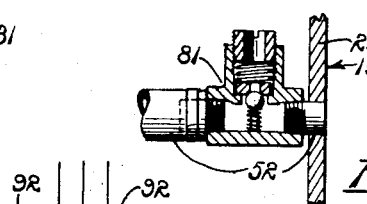

Fig. 11 is an enlarged section through a pressure relief check valve employed in the second form of the invention.

Figure 12:
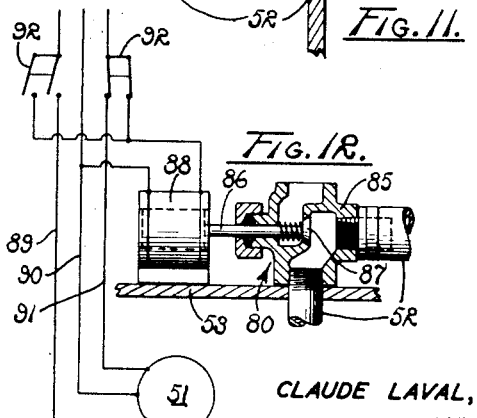

Fig. 12 is a section of a solenoid actuated valve illustrated in association with a diagrammatical representation of an electrical circuit for operating the valve in the second form of the invention.

Referring in greater detail to the drawings.

The submersible stepped progression camera apparatus of the instant invention is adapted to photograph the interior of well casings or other boreholes such as that illustrated in the drawings and indicated by the reference numeral 10. Well casings are conventionally driven into holes bored into the earth and are frequently, particularly in oil wells, thousands of feet in length. For convenience of illustration the casing is foreshortened in the drawings but it is to be borne in mind that to be fully applicable to the wide range of requirements, the camera apparatus must be operable at great depths and under a wide range of operating conditions. Enclosed in the well casing is usually a well liquid 11, in the form of water, oil, or the like. The liquid is usually opaque or translucent and not sufficiently clear for photographic or other viewing purposes.

The camera apparatus includes an elongated hollow upper cylindrical housing 15 and a hollow lower cylindrical housing 16 interconnected for relative longitudinal movement by a hollow extension cylinder 17. The housings 15 and 16 are conveniently of the same diameter. Inflatable bladders 18 and 19 circumscribe both of the housings 15 and 16. These bladders are alternately inflated by means hereinafter described to seal the portion of the casing thereabove form the portion of the casing therebelow. While I prefer to employ the bladders to function as packers about the housings because of their convenient and effective control and operation, it will be apparent that many other forms of packers can be utilized without departing from the spirit or scope of the invention. Any suitable means for providing the desired controllable barrier about the housings to fluid movement past the apparatus may be utilized. During operation, clear fluid 20 is caused to pass from a clear fluid chamber 21 in the upper housing to a position below the lower housing to provide a suitable replacement fluid for the well liquid 11 through which visual images can be received. A camera 22 is sealed in the lower housing 16 and has a viewing area downwardly from the lower housing.

As clearly shown in Fig. 2 of the drawings, the upper housing has a cylindrical wall 25, the upper end of which is closed by a pointed, preferably paraboloidal, hollow cap 26 that is threaded at 27 to the upper end of the upper housing 15. The upper pointed end of the cap is fitted with a threaded plug 28 having an integral eye 29 to which one end of a cable 30 may be attached for positioning the apparatus and particularly the upper housing in precisely desired positions longitudinally of the well casing 10.

The hollow extension cylinder 17 is slidably guided in the lower end of the upper housing 15 by a bushing 31 partially enclosing the lower end of the upper housing and formed with a cylindrical bearing surface 32 to which the extension cylinder is slidably fitted. The extension cylinder is also slidably guided a distance above the bushing 31 by a bearing ring 33 secured internally of the upper housing and formed with a bearing surface 34 concentrically aligned with the bearing 32 and through which the extension cylinder slides. The spaced bearing surfaces 32 and 34 slidably guide the lower housing coaxially of the upper housing. Longitudinal movement of the extension cylinder 17 relative to the upper housing 15 is limited by a limit stop ring 35 secured in circumscribing relation on the extension cylinder between the bushing 31 and the bearing ring 33. The limit stop ring 35 is appreciably smaller in outside diameter than the inner diameter of the upper housing 15 so that liquid in the upper housing can pass freely past the stop ring as the ring moves axially in the extension cylinder on relative movement of the upper and lower housings. Thus, the limit stop ring 35 limits the extent of relative movement of the upper and lower housings by its engagement with either the bushing 31 or the bearing ring 33.

Similarly to the upper housing, the lower housing 16 has a cylindrical wall 40 closed at its lower end by a lower end wall 41. At the lower end of the extension cylinder 17 is provided a radial flange 42 that is attached to the upper end of the lower housing 16 by a plurality of bolts 43 with the lower housing coaxially of the upper housing.

Both the upper bladder and the lower bladder are made of flexible water and/or oil impervious sheet material, or other material resistant to the fluid of immersion and replacement, formed and mounted to define chambers in circumscribing relation to their respective housings. The upper and lower edges of both of the bladders are conveniently attached to their respective housings by bands 44 wrapped tightly around the edges of the bladders. The lower bladder is inflatable and deflatable by a reversible pump 45 driven by a reversible electric motor 46. The pump is interposed the ends of a conduit 47 interconnecting the flange 42 on the extension cylinder and the cylindrical wall 40 of the lower housing 16 for forcing liquid to and from the lower bladder and the interior of the well casing above the lower housing for inflation and deflation of the bladder. The conduit has an open end within its bladder and an opposite open end exteriorly of the housing 16 adjacent to the extension cylinder 17, as shown.

Opposite successive inflation and deflation of the upper and lower bladders is accomplished by passing fluid therebetween. To this end, a reversible pump 50 is mounted within the upper end of the extension cylinder and driven by a reversible electric motor 51. The pump 50 is interposed between the ends of a conduit 52 which conduit passes through an upper end wall 53 of the extension cylinder. One end of the conduit 52 is connected through the cylindrical wall 40 of the lower housing and the other end thereof is connected through the cylindrical wall 25 of the upper housing for fluid communication between the upper and lower bladders. The portion of the conduit 52 between the upper end wall 53 of the extension cylinder and the cylindrical wall 25 of the upper housing is flexible to accommodate relative movement between the extension cylinder and the upper housing. Thus on actuation of the reversible pump, the upper and the lower bladders may be alternately and oppositely inflated and deflated.

The clear fluid chamber 21 is defined partially by the cylindrical wall 25 of the upper housing and partially by a pair of partitions 56 and 57 across the upper housing. Spaced below the partition 57 is another partition 58 secured across the upper housing with the partitions 57 and 58 defining a pump chamber 59. Extending vertically and axially through the three partitions 56, 57 and 58 is a tube 60 in sealed relation thereto. Dividing the clear fluid chamber into vertically related separate portions to segregate clear fluid from opaque fluid, is a piston 61 slidably fitted about the tube 60 and within the interior of the fluid chamber. During an initial phase of operation of the apparatus subsequently more fully described, fluid is pumped from the clear fluid chamber 21 to a position below the lower housing, with the lower bladder 19 inflated, through a conduit 62 connected at its upper end to the chamber through the partition 57 and open at its lower end which is extended through the lower end wall 41 of the lower housing. The pumping action is effected by a reversible pump 63 driven by a reversible electric motor 64. The clear fluid conduit 62 between the lowest partition 58 and the upper end wall 53 of the extension cylinder is flexible to permit relative movement of the upper housing and the extension cylinder. As clear fluid is pumped from the clear fluid chamber below the piston 61, well fluid 11 is drawn into the clear fluid chamber above the piston to replace the fluid removed from the chamber. The principle purpose of the piston is to segregate well fluid from the clear fluid and of course can be replaced by any suitable equivalent device or omitted if the clear fluid utilized is sufficiently immiscible with the well fluid. While the use of a piston to separate clear fluid from well fluid is only one expedient of many that may be employed for this purpose, it is excellently suited to the purpose.

Well fluid 11 to replace clear fluid 20 pumped from the clear fluid chamber 21 is preferably drawn from a position appreciably below the lower housing 16 where clear fluid replaces the well fluid. In passing from a position below the lower housing to the clear fluid chamber, the well fluid passes through a well fluid conduit 68 and a well fluid conduit extension 69. The well fluid conduit is connected at its upper end to the upper end of the clear fluid chamber and extends downwardly through the tube 60, the extension cylinder 17 and the lower housing 16. The well fluid conduit extension is comparatively rigid and continuous with the well fluid conduit and extends appreciably below the lower housing where it terminates in downwardly spaced relation to the housing. As clear fluid is pumped out of the clear fluid housing from below the piston 61 to a position immediately below the lower housing, well fluid is drawn, by such pumping of the clear fluid, into the lower end of the well fluid conduit extension and upwardly into the clear fluid chamber above the piston. As are all of the conduits that pass through the upper end wall 53 of the extension cylinder 17, this well fluid conduit is flexible between the end wall 53 of the extension cylinder and the lower end of the tube 60.

A lamp socket 71 is mounted on the lower end of the well fluid conduit extension 69 and is supported on this conduit extension and also on a pair of support rods 72 attached to the lower end wall 41 of the lower housing and extended downwardly therefrom. Any suitable, preferably electrically energized lamp 73, is mounted in the socket thereof.

The camera 22 preferably has a pair of laterally spaced lenses 74 extended through the lower end wall of the lower housing and directed longitudinally of the well casing for taking stereoscopic photographs. The thus attainable depth perception is advantageous to borehole investigation. As previously suggested, any of a great variety of cameras can be utilized but the camera 22 conveniently takes the form of a shutterless camera through which strip film is traveled in units of stepped progression by an electrical motor, not shown, located therein. For example, a suitable camera is shown and described in my copending patent applications, Serial No. 257,107, entitled "Borehole Camera Apparatus," Patent No. 2,677,966, issued May 11, 1954, and my United States Patent No. 2,633,783 issued April 7, 1953. The motor of the camera, the lamp 73, and the motors 46, 51 and 64 are selectively energized by means of insulated conductors 75 connected thereto and extended through the tube 60 and fitting plug 28 to a position, not shown, remote from the apparatus, such as the top of the well, for selective connection and disconnection to a source of electrical energy, likewise not shown.

*Operation*

The operation and utility of the present invention are believed to be apparent and are summarized at this point. In preparation for taking pictures of the interior of a well casing 10 containing well fluid, a cable 30 is attached to the eye 29 of the plug 28 at the upper end of the upper housing 15. The other end of the cable is attached to suitable apparatus, such as a power operated winch, not shown, whereby the photographic device is lowered into the well. Both of the bladders 18 and 19 are collapsed for lowering purposes and the lower housing 16 is gravitated downwardly from the upper housing to the extent permitted by the limit stop ring 35. When the desired level in the well casing is reached, downward motion of the apparatus is halted.

In further preparation for photographing the well casing or objects contained therein, the motor 46 is electrically energized to operate the pump 45 in the direction to pump well fluid through the conduit 47 from the casing into the lower bladder 19 inflating the same to sealed relation against the interior of the well casing, as shown clearly in Fig. 2 of the drawings. If other packing means are employed, comparably suitable steps are taken to seal the portion of the well below the lower housing from the portion thereabove.

When the lower bladder 19 is sealed against the well casing, the motor 64 is electrically energized and the pump 63 actuated to pump clear fluid from the clear fluid chamber 21 downwardly through the conduit 62 to a position below the lower housing 16 and lower bladder and at the same time to draw well fluid into the lower end of the conduit extension 69 from below the lower housing into the clear fluid chamber. In this manner, well fluid below the lower housing and lower bladder is replaced by clear fluid and the clear fluid drawn from the clear fluid chamber is replaced by well fluid drawn from below the lower housing. Sufficient clear fluid is thus supplied to the viewing area to replace the well fluid for a distance below the lower housing sufficient for desired inspection. Normally the clear fluid is not caused to extend appreciably below the lamp for the most effective photography is performed between the lamp and the housing. In this environment of clear fluid, suitable stereoptical photographs may be taken to record the condition of that portion of the interior of the well casing containing the clear fluid and objects contained therein.

In order to take pictures or otherwise produce viewable images lower in the well, the cable 30 is slacked. This lowers the upper housing 15 downwardly while the lower bladder is still inflated and holds the lower housing 16 in position. The upper housing may be lowered until the limit stop ring 35 engages the bearing ring 33. With the upper housing 15 in this position in relation to the lower housing 16 and with the support cable 30 taut the motor 51 is energized to operate the pump 50 in a direction to pump fluid from the lower baldder 19 into the upper bladder 18. This is continued until the upper bladder is inflated in sealed relation to the interior of the well casing 10 and the lower bladder deflated. When the lower bladder becomes partially deflated so as to release the lower housing from the casing, it gravitates downwardly from the upper housing until the limit stop ring 35 engages the bushing 31. In this condition the lower housing and the camera and lens thereof are stepped downwardly a distance from initial viewing position regulated by the extent of permissive movement of the limit stop ring 35. The camera or other viewing device is then operated as before. It will be noted that little or none of the clear fluid 20 is lost by the inflation of the upper bladder 18 and the deflation of the lower bladder 19.

The camera apparatus again may be moved downwardly in the well casing by actuating the pump 50 in its direction to pump fluid from the upper bladder 18 into the lower bladder 19 through the conduit 52, inflating the lower bladder and deflating the upper bladder while the apparatus is supported on the cable. Thus the lower housing is again sealed against the well casing and the upper housing is released therefrom. This completes a cycle of operation of the stepped progression of the apparatus in the well casing. To continue the operation, the cable is slackened to lower the upper housing and the described procedure repeated.

It will be apparent that in collapsing the upper bladder 18 and expanding the lower bladder 19, at least a small quantity of clear replacement fluid previously trapped between the two bladders may escape upwardly but the loss is in most instances negligible and may be replaced by pumping additional clear fluid outwardly of the conduit 52 until the supply thereof in the chamber 21 is exhausted.

If it is desired to avoid substantially all loss of the replacement fluid 20, the pump 50 can be reversed to return the clear fluid to the reservoir 21 prior to each collapse of the lower bladder 19 and again employed to pump the fluid into the casing below the lower bladder following the lowering of the housing 16 and re-inflation of the lower bladder. In most instances, however, this additional precaution is unwarranted.

While the operation of the camera apparatus has been described in terms of stepped progression downwardly in the casing 10, in which event the replacement fluid 21 is preferably of a lower specific gravity than the fluid 11 in the well and the housings 15 and 16 heavier than the well fluid they displace, a simple modification makes possible the use of the described apparatus for upward stepped progression in a borehole with little loss of replacement fluid. For such use the lower housing 16 and the extension cylinder 17 are made lighter than the well fluid they displace so that they possess buoyancy. The upper housing 15 is of sufficiently greater weight than the fluid it displaces that the combined apparatus will descend in the well fluid to the desired depth of inspection. So constructed the device does not descend as smoothly as when both housings are heavier than the well fluid but under the guiding influence of the casing 10 any tendency of the apparatus to invert is easily avoided.

In the modified form described, which is adapted to progress upwardly in units of stepped progression, the apparatus is lowered to the desired depth of investigation in the casing 10 and the lower bladder 19 inflated, as previously described. The clear fluid 20 is pumped downwardly from the chamber 21. The camera 22 is operated as described. The cable 30 is then employed to raise the upper housing 15 relative to the lower housing 16 to the extent permitted by the stop 35. The pump 50 is actuated to inflate the upper bladder 18 and to deflate the lower bladder 19. This releases the lower housing to float upwardly as far as permitted by the stop and the replacement fluid moves upwardly therewith. Thereupon the lower bladder is inflated, the upper bladder deflated, the camera operated, and the sequence of operations repeated, as desired.

*Second form*

A second form of the invention, shown in Figs. 9 to 11 inclusively, is of substantially the same construction as the first form of the invention and similar elements are given corresponding identifying numerals. This form has substantially all of the elements of construction of the first form but omits the pump 45, the motor 46 and the conduit 47 and utilizes a solenoid operated drain valve 80 and a pressure relief check valve 81 in the conduit 52 that leads from one of the bladders to the other. Also ports 82 are formed through the cylindrical wall 25 of the upper housing 15 and passages 83 formed through the bearing ring 33. The ports 82 and the passages 83 permit access of well casing liquid into a liquid supply chamber 84 interiorly of the upper housing 15 between the partition 58 and the bearing ring 33 thereof.

When the motor 51 is energized to operate its associated pump 50 to inflate the lower bladder 19, the pump reduces the pressure in the substantially collapsed upper bladder and when the pressure differential between the fluid in the conduit 52 and the fluid in the chamber 84 is sufficient, the check valve 81 opens permitting the pumping of well fluid contained in the chamber into the lower bladder to expand the same. When it is desired to deflate the lower bladder 19 and inflate the upper bladder 18, the motor 51 and pump 50 are reversed to draw the fluid from the lower bladder and force it into the upper bladder. For reasons which will subsequently become apparent, the motor and pump are preferably run continuously during operation of the camera apparatus except during the very brief intervals required for reversing. The pump 50 is thus provided with conventional by-pass features whereby excess pressures in the bladders are avoided by by-passing fluid through the pump when pressures adequate to achieve desired inflation are attained.

As shown in Fig. 12 of the drawings, the solenoid operated drain valve 80 is connected in the conduit 52 and electrically energized so that it is normally closed during operation of the motor 51. To this end, the valve has a casting 85 through which well liquid flows in passing through the conduit 52. A valve stem 86 is slidable in the casting and has a valve head 87 seatable in the casting. A solenoid 88 is connected to the valve stem in a manner so that when it is electrically energized the valve head is seated in closing relation to the valve casting. During operation of the apparatus and during the cycles of stepped progression thereof in the well casing, the motor 51 is continuously energized except during switching intervals.

As illustrated in the schematic diagram of Fig. 12, the solenoid 88 is electrically connected to the reversible energizing circuit for the motor 51 so as to be actuated whenever the motor is energized. For illustrative convenience, the motor is shown as energizable through conductors 89 and 90, to run in one direction, and through conductors 90 and 91 to run in the opposite direction. Two pole switches 92 are connected in the conductors 89 and 91 and are alternately closable to actuate the motor in opposite directions. Each of the switches is connected with the solenoid in parallel with the motor. While it will be understood that in most instances only two conductors and a single reversing switch are utilized for the motor, the schematic representation is believed more clearly to disclose the joint actuation of the motor and solenoid so that the valve 80 is closed whenever the motor 51 is operated and alternately opens whenever the motor is de-energized so that well liquid contained in either or both of the bladders is released permitting the bladders to contract for removal of the apparatus from the casing.

In the operation of the second form of the invention, the step of lowering the apparatus into the well casing is identical to that of the first form of the invention. It will be noted that as the apparatus is lowered into the liquid in the well casing, the liquid supply chamber of the upper housing becomes completely filled with the well liquid, through the ports 82 and the passages 83.

When the apparatus reaches the level at which photographs are to be taken, the motor 51 is actuated to pump fluid from the fluid supply chamber through the pressure relief check valve 81 to the lower bladder 19. After clear fluid is pumped into the well casing below the lower housing, as previously described, a photograph or other viewable image may be taken of the interior of the well casing.

The camera may be stepped downwardly without losing an appreciable quantity of the clear fluid by lowering the upper housing downwardly toward the lower housing and reversing the motor 51 and pump 50 to pass the liquid from the lower bladder to the upper bladder 18, as in the first form of the invention. As the liquid passes from the lower bladder to the upper bladder, the upper bladder is inflated and the lower housing 16 drops relative to the upper housing. After the camera apparatus has been caused to progress along the well casing to the extent desired, the motor 51 is de-energized, stopping the pump 50, de-energizing the solenoid 88 and permitting the valve 87 to open. With the valve 87 open, sufficient liquid can drain from the conduit 52 to cause the bladders to deflate and permit raising of the device from the well casing.

The described embodiments of the present invention conveniently adapt the borehole camera apparatus described in my United States patent application, Serial No. 257,107, Patent No. 2,677,966, issued May 11, 1954, for stepped progression in boreholes so that continuous or intermittent records can be made of extensive areas of investigation. Because of the minimized loss of replacement fluid 20, greatly increased lengths of boreholes can be investigated without removing the camera apparatus therefrom to obtain a new supply of replacement fluid. The alternate employment of the bladders 18 and 19, or other packing devices, achieves dependable camera location and accurately controlled stepped progression thereof in predetermined increments. The two forms of the invention are simple in structure, durable, and fully effective in accomplishing their intended purposes.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A stepped progression borehole camera apparatus comprising a pair of housings, means interconnecting the housings for relative movement toward and from each other, means connected to one of the housings for lowering the housings and interconnecting means into a borehole, expansible liquid barrier means mounted about each of the housings, controlled means for alternately and oppositely expanding and contracting the barrier means to and from engagement with walls of the borehole whereby when the lower barrier means is expanded the upper housing is free to gravitate downwardly toward the lower housing and when the upper barrier means is expanded the lower housing is free to gravitate downwardly from the upper housing for downward stepped progression of the apparatus, and means for producing a viewable image mounted in one of the housings and having a viewing area externally thereof.

2. A stepped progression borehole camera apparatus comprising a pair of body members, an extension member slidably interconnecting the body members for relative movement toward and from each other, means connected to one of the body members for lowering the body members and the extension member into a borehole, expansible means mounted in circumscribing relation on each of the body members for expansion into engagement with the walls of the borehole, remotely operable control means for alternately and oppositely expanding and contracting the expansible means to and from engagement with the walls of the borehole, means for producing an image viewable remotely from the body members mounted by one of the members and having a viewing area externally thereof within the borehole, a reservoir for light transmissible fluid mounted in one of the members, and remotely controlled means for transferring a light transmissible fluid from the reservoir into the viewing area of the image producing means.

3. A stepped progression borehole camera apparatus comprising a pair of housings, an extension member slidably interconnecting the housings for relative movement toward and from each other, means connected to one of the housings for lowering the housings and interconnecting member into a borehole and liquid contained therein, expansible liquid barrier means mounted in circumscribing relation on each of the housings, remotely operated control means for alternately and oppositely expanding and contracting the barrier means to and from engagement with walls of the borehole whereby when the lower barrier means is expanded the upper housing is free to gravitate downwardly toward the lower housing and when the upper barrier means is expanded the lower housing is free to gravitate downwardly from the upper housing for downward stepped progression of the apparatus, means for producing an image viewable remotely from the housings mounted in one of the housings and having a viewing area externally thereof, a reservoir for light transmissible fluid mounted in one of the housings, and remotely controlled means for exchanging liquid in the borehole in the viewing area of the image producing means with light transmissible fluid in the reservoir.

4. In an apparatus for photographing in liquids contained in boreholes such as water wells, oil wells and the like, the combination of a pair of housings, an extension member slidably interconnecting the housings for relative movement toward and from each other within predetermined limits, means for lowering the housings and interconnecting member into a borehole, means mounted in circumscribing relation on each of the housings having peripheral portions engageable with the interior walls of the borehole into which the housings and extension member are lowered to form a barrier around the housing between the housing and said interior walls of the borehole to the movement of liquid in the borehole upwardly past the housing between the housing and the interior walls of the borehole, means for alternately contracting the barrier means of the housings from engagement with the walls of the borehole whereby the housings are successively lowered in increments of stepped progression within the predetermined limits of relative movement of the housings, reservoir means connected to one of the housings for containing a transparent liquid, camera apparatus mounted within one of the housings having a field of vision externally of the housing below the barrier means of the lower housing, and means for removing liquid from the borehole exteriorly of the lower housing below its respective barrier means into the reservoir means and for simultaneously supplanting the thus removed liquid with transparent liquid from the reservoir means.

5. A stepped progression borehole camera apparatus comprising a pair of elongated housings, means slidably interconnecting the housings in substantial alignment for longitudinal movement toward and from each other, means for lowering the housings and interconnecting means into a fluid containing borehole, a camera mounted in one of the housings having a field of vision exteriorly of the housing, a hollow elastic bladder mounted in circumscribing relation on each of the housings, pump means within the housings remotely operable alternately to pump fluid of the borehole into one of the bladders while the opposite bladder is collapsed whereby the bladders alternately provide fluid barrier means between their respective housings and the wall of the borehole, a reservoir for light transmissible fluid contained by the housings, and a remotely controlled pump adapted to remove liquid from the borehole in the vicinity of the field of vision of the camera exteriorly of its respective housing into the reservoir and for simultaneously supplanting the thus removed liquid at a location adjacent to the field of vision of the camera with liquid from the reservoir.

6. A stepped progression borehole camera apparatus comprising a pair of elongated housings, an elongated member connected to one of the housings and slidably telescopically fitted to the opposite housing interconnecting the housings in substantial alignment for relative movement toward and from each other, means connected to one of the housings for lowering the housings and their interconnecting elongated member into a liquid containing borehole whereby the housings are located in elevationally spaced relation, an elastic bladder mounted in circumscribing relation on the upper housing, an elastic bladder mounted in circumscribing relation on the lower housing, pump means having an outlet within the lower bladder and an intake open to the borehole for pumping fluid from the borehole into the lower bladder, reversible pump means interconnecting the bladders whereby fluid is pumped between the bladders alternately and oppositely to contract and to expand the same, a camera mounted in the lower housing and downwardly directed therefrom having a field of vision exteriorly of the lower housing, a reservoir for light transmissible fluid mounted in the upper housing, and replacement fluid pump means having an outlet adjacent to the lower housing below the bladder thereof and an intake connected to the reservoir.

7. A stepped progression borehole camera apparatus comprising a substantially cylindrical upper housing, a substantially cylindrical lower housing, an annular bearing ring mounted concentrically in the upper housing intermediate the ends thereof, a bushing having a bearing surface axially aligned with the bearing ring mounted in the lower end of the upper housing, a substantially cylindrical extension rigidly mounted on the upper end of the lower housing and slidably extended through the bearing surfaces of the bushing and the bearing ring interconnecting the housings in substantial axial alignment for adjustable relative movement toward and from each other, a stop ring mounted on the extension between the bearing ring and the bushing engageable therewith to limit movement of the housings toward and from each other, an expansible bladder mounted in circumscribing relation on each of the housings, means connected to the upper housing for lowering the housings and extension into a borehole containing liquid, reversible pump means mounted on the lower housing having an intake open outwardly of the housing and a discharge extended into the bladder of the lower housing, a second reversible pump connected between the bladders of the upper and lower housings, a camera mounted in the lower housing and downwardly directed therefrom having a field of vision exteriorly below the lower housing, a reservoir having upper and lower ends for light transmissible fluid in the upper housing, a conduit having an open lower end in downwardly spaced relation to the lower housing extended upwardly through the lower housing, the extension, and into the upper housing having an upper end connected to the upper end of the reservoir, and a third pump having an intake connected to the lower end of the reservoir and a discharge extended outwardly of the lower housing below the bladder thereof.

8. A stepped progression borehole apparatus comprising a substantially cylindrical upper housing, a substantially cylindrical lower housing, an annular bearing ring mounted concentrically in the upper housing intermediate the ends thereof, a bushing having a bearing surface axially aligned with the bearing ring mounted in an end of the upper housing, a substantially cylindrical extension rigidly mounted on the upper end of the lower housing and slidably extended through the bearing surface of the bushing and the bearing ring interconnecting the housings in substantial axial alignment for adjustable relative movement toward and from each other, a stop ring mounted on the extension between the bearing ring and the bushing alternately engageable therewith to limit movement of the housings toward and from each other, an expansible bladder mounted in circumscribing relation on each of the housings, a reversible bladder control pump, a lower conduit interconnecting one side of the pump and the bladder of the lower housing, an upper conduit interconnecting the opposite side of the pump to the bladder of the upper housing, a check valve located in the upper conduit having a releasably closed inlet exposed to fluid in the borehole operable to seal the conduit from the fluid of the borehole when pressure in the upper conduit is above a predetermined level and to open for the inflow of borehole fluid when the pressure in said conduit is below said predetermined level, a reversible motor having driving connection with the reversible pump, a remotely controlled reversible electrical circuit connected to the motor whereby the motor and pump can be remotely controlled, and a solenoid actuated drain valve in the upper conduit closed by actuation of the solenoid, the solenoid being connected in the electrical circuit in parallel with the motor whereby the solenoid is actuated when the motor is energized.

9. A stepped progression borehole camera apparatus comprising a substantially cylindrical upper housing, a substantially cylindrical lower housing, an annular bearing ring mounted concentrically in the upper housing intermediate the ends thereof, a bushing having a bearing surface axially aligned with the bearing ring mounted in an end of the upper housing, a substantially cylindrical extension rigidly mounted on the upper end of the lower housing and slidably extended through the bearing surface of the bushing and the bearing ring interconnecting the housings in substantial axial alignment for adjustable relative movement toward and from each other, a stop ring mounted on the extension between the bearing ring and the bushing alternately engageable therewith to limit movement of the housings toward and from each other, an expansible bladder mounted in circumscribing relation on each of the housings, a reversible bladder control pump, a lower conduit interconnecting one side of the pump and the bladder of the lower housing, an upper conduit interconnecting the opposite side of the pump to the bladder of the upper housing, a check valve located in the upper conduit having a releasably closed inlet exposed to fluid in the borehole operable to seal the conduit from the fluid of the borehole when pressure in the upper conduit is above a predetermined level and to open for the inflow of borehole fluid when the pressure in said conduit is below said predetermined level, a reversible motor having driving connection with the reversible pump, a remotely controlled reversible electrical circuit connected to the motor whereby the motor and pump can be remotely controlled, a solenoid actuated drain valve in the upper conduit closed by actuation of the solenoid having the solenoid connected in the electrical circuit in parallel with the motor whereby the solenoid is actuated when the motor is energized, a camera mounted in the lower housing and downwardly directed therefrom having a field of vision exteriorly below the lower housing, a reservoir for light transmissible fluid pumping light transmissible fluid from the reservoir into the borehole below the bladder of the lower housing.

10. A borehole apparatus, adapted for movement in stepped progression upwardly in a borehole while immersed in liquid contained in a borehole, comprising an upper housing, a lower housing, means slidably interconnecting the housings in substantial alignment for relative movement toward and from each other, the lower housing being buoyant in the borehole liquid and the upper housing being of sufficient weight that the combined apparatus is heavier than the borehole liquid it displaces, means connected to the upper housing for lowering the housings and interconnecting means into a borehole and retracting the same therefrom, expansible liquid barrier means mounted about each of the housings in circumscribing relation thereto, control means for alternately and oppositely expanding and contracting the barrier means to and from engagement with walls of the borehole whereby when the upper barrier means is expanded into engagement with the walls of the bore hole the lower barrier means is contracted freeing the lower housing to float upwardly toward the upper housing and whereby when the lower barrier means is expanded and the upper barrier means contracted the lower housing is held in position in the borehole and the upper housing is freed for lifting by the lowering and raising means, and means for producing a viewable image mounted in one of the housings and having a viewing area externally thereof.

11. A borehole camera apparatus, adapted for movement in stepped progression upwardly in a borehole while immersed in liquid contained in a borehole, comprising an upper housing, a lower housing, means slidably interconnecting the housings in substantial alignment for relative movement toward and from each other, the lower housing being buoyant in the borehole liquid and the upper housing being of sufficient weight that the combined apparatus is heavier than the borehole liquid it displaces, means connected to the upper housing for lowering the housings and interconnecting means into a borehole and retracting the same therefrom, expansible liquid barrier means mounted about each of the housings in circumscribing relation thereto, control means for alternately and oppositely expanding and contracting the barrier means to and from engagement with walls of the borehole whereby when the upper barrier means is expanded into engagement with the walls of the borehole the lower barrier means is contracted freeing the lower housing to float upwardly toward the upper housing and whereby when the lower barrier means is expanded and the upper barrier means contracted the lower housing is held in position in the borehole and the upper housing is freed for lifting by the lowering and raising means, means for producing a viewable image mounted in the lower housing and having a viewing area externally thereof below the apparatus, a reservoir for light transmissible liquid mounted in one of the housings, and remotely controlled means for replacing liquid in the borehole downwardly adjacent to the lower housing with light transmissible liquid from the reservoir.

12. A borehole camera apparatus, adapted for movement in stepped progression upwardly in a borehole while immersed in liquid contained in a borehole, comprising an upper housing, a lower housing, means rigidly mounted on the lower housing and slidably engaged in the upper housing interconnecting the housings for relative movement toward and from each other and limiting said movement of the housings toward and from each other, the lower housing and the interconnecting means being buoyant in the borehole liquid and the upper housing being of sufficient weight that the combined apparatus is heavier than the borehole liquid it displaces when immersed therein, means connected to the upper housing for lowering the housings and interconnecting means into a borehole and retracting the same therefrom, expansible bladders mounted about each of the housings in circumscribing relation thereto, control means for alternately and oppositely expanding and contracting the bladders to and from engagement with walls of the borehole whereby when the upper barrier means is expanded into engagement with the walls of the borehole the lower barrier means is contracted to free the lower housing to float upwardly toward the upper housing and whereby when the lower barrier means is expanded and the upper barrier means contracted, the lower housing is held in position in the borehole and the upper housing is freed for movement upwardly by the lowering and raising means, a camera mounted in the lower housing and having a viewing area externally thereof below the apparatus, a reservoir for light transmissible liquid mounted in one of the housings, and remotely controlled pump means connected to the reservoir adapted to interchange liquid in the borehole in the viewing area of the camera and light transmissible liquid in the reservoir.

13. In an apparatus adapted for movement in increments of stepped progression longitudinally of a borehole including a hollow substantially fluid tight body member having an upper housing, a lower housing, and an extension member slidably interconnecting the housings for relative movement toward and from each other; the combination of annular expansible and contractible borehole engaging means circumscribing each of the housings and rigidly mounted on their respective housings; electrically actuated means for expanding and contracting the borehole engaging means, mounted within the body member, and having connection to the engaging means; and an electrical system including a control switch remote from the body member connected to the electrically actuated means within the body member and operable alternately and oppositely to expand and to contract the engaging means for alternate engagement with the borehole.

14. In the apparatus of claim 13, for elevational progression longitudinally of a downwardly extended borehole containing a liquid while supplying and maintaining a replacement liquid elevationally adjacent thereto during such progression, said combination further including a chamber within the body member containing a replacement liquid for the borehole liquid; an intake conduit connected to the chamber having an open end exteriorly of the body member endwardly thereof from both of the borehole engaging means; a replacement conduit connected to the chamber in elevationally spaced relation to the intake conduit and having an open end exteriorly of the body member adjacent to the open end of the intake conduit, the chamber, intake conduit and replacement conduit constituting a liquid replacement system; a replacement pump within the body member connected in said replacement system adapted upon energization to deliver liquid to and from the chamber through said conduits from and to the borehole endwardly of the body member; an electric motor in the body member having driving connection to the replacement pump; and an electric system including a control switch remote from the body member connected to said motor.

15. An apparatus for advancing in controlled increments of stepped progression longitudinally of a borehole containing a liquid comprising a pair of hollow body members slidably interconnected for relative movement between predetermined limits toward and from each other, inflatable means mounted in circumscribing relation on each body member and adapted for lateral expansion therefrom when filled with an inflating medium, electrically powered reversible pump means mounted within the body members and connected to the inflatable means for transferring inflating medium back and forth from one of the inflatable means to the other for alternately and oppositely expanding and contracting the inflatable means, said inflatable means and pump means constituting a common fluid system, means for admitting liquid from the borehole into the fluid system to provide the inflating medium, and an electric system connected to the electrically powered pump means having a reversing switch remote from the body members.

16. The apparatus of claim 15, for elevational progression longitudinally of a downwardly extended borehole containing a liquid while supplying and maintaining a replacement liquid elevationally adjacent thereto during such progression, said apparatus including a chamber within one of the body members containing a replacement liquid for the borehole liquid, an intake conduit connected to the chamber having an open end exteriorly of the body members endwardly thereof from both of the inflatable means, a replacement conduit connected to the chamber in elevationally spaced relation to the intake conduit and having an open end exteriorly of the body members adjacent to the open end of the intake conduit, the chamber, intake conduit and replacement conduit constituting a liquid replacement system, a replacement pump within one of the body members connected in said replacement system adapted upon energization to deliver liquid to and from the chamber through said conduits from and to the borehole endwardly of the body member, an electric motor in one of the body members having driving connection to the replacement pump, and an electric system including a control switch remote from the body members connected to said motor.

17. In an apparatus urged in a predetermined direction longitudinally of a borehole containing a liquid adapted to limit movement of the apparatus to increments of stepped progression, the combination of a hollow substantially fluid tight body member having a pair of housings and an extension member slidably interconnecting the housings for relative movement toward and from each other; annular expansible means mounted in circumscribing relation on each of the housings adapted for independent expansion into engagement with the walls of a borehole to provide a barrier to fluid movement in the borehole past the body member and contraction therefrom; electrically operable means for expanding and contracting the annular means, mounted within the body member, and having connection to the expansible means whereby said means are alternately and oppositely expandible and contractible incident to energization of said electrically operable means; and an electric system connected to the electrically operable means within the housing and including a reversible switch remote from the housing.

18. In an apparatus for producing viewable images of objects in liquids contained in the bores of water wells, oil wells and the like, the combination of: a hollow body member having an upper housing, a lower housing, and an extension member slidably interconnecting the housings for relative movement toward and from each other; annular expansible means mounted in circumscribing relation on each of the housings adapted for independent expansion into engagement with the walls of a borehole to provide a barrier to fluid movement in the borehole past the body member and contraction therefrom; electrically operable means for expanding and contracting the annular means, mounted within the body member, and having connection to the expansion means whereby said means are alternately and oppositely expandible and contractible incident to energization of the electrically operable means; an electric system connected to the electrically operable means within the housing and including a reversible switch remote from the housing whereby the expansible means are alternately and oppositely expanded and contracted; a chamber within the body member for containing a transparent liquid; a camera apparatus mounted within the body member having a field of view exteriorly of the body member; and means for removing liquid from the borehole exteriorly of the body member in the field of view of the camera, means for delivering the removed fluid to the chamber and for simultaneously supplanting the thus removed liquid with transparent liquid from the chamber.

19. In an apparatus adapted gravitationally to be lowered into a borehole having a circumscribing wall and containing a liquid and to be raised from such borehole, both in increments of stepped progression while maintaining a fluid tight seal between said apparatus and the circumscribing wall of the borehole during each increment of progression, said apparatus comprising a hollow substantially fluid tight body member having an upper substantially cylindrical housing, a lower substantially cylindrical housing axially aligned with the upper housing, and an extension member slidably interconnecting the upper and lower housings for relative movement toward and from each other, the housings being of a substantially common diameter less than the diameter of the borehole; a lowering and raising cable connected to the upper housing; a pair of hollow annular inflatable bladders individually circumscribing the housings and rigidly mounted on their respective housings, each of said bladders being expansible into substantially fluid tight engagement with the wall of the borehole to provide a seal between the body member and said wall and contractible therefrom; reversible pump means mounted within the body member having opposite alternate inlet and outlet ports; conduits individually connecting the opposite ports of the pump with the bladders on the opposite housings, the bladders, conduits, and pump means constituting a common fluid system; means for supplying liquid from the borehole to said fluid system; a reversible electric motor mounted within the housing and having driving connection to the pump, and a reversible electric system connected to the motor and extended remotely from the body member for remote control of the motor.

20. In a submersible photographic apparatus adapted gravitationally to be lowered into a borehole having a circumscribing wall and containing a liquid and to be raised from such borehole, both in increments of stepped progression while maintaining a fluid tight seal between said apparatus and the circumscribing wall of the borehole during each increment of progression, while supplying and maintaining a replacement liquid elevationally adjacent to the apparatus during such progression comprising a hollow substantially fluid tight body member having an upper substantially cylindrical housing, a lower substantially cylindrical housing axially aligned with the upper housing, and an extension member slidably interconnecting the upper and lower housings for relative movement toward and from each other, the housings being of a substantially common diameter less than the diameter of the borehole; a lowering and raising cable connected to the upper housing; a pair of hollow annular inflatable bladders individually circumscribing the housings and rigidly mounted on their respective housings, each of said bladders being expansible into substantially fluid tight engagement with the wall of the borehole to provide a seal between the body member and said wall and contractible therefrom; reversible pump means mounted within the body member having opposite alternate inlet and outlet ports; conduits individually connecting the opposite ports of the pump with the bladders on the opposite housings, the bladders, conduits, and pump means constituting a common fluid system; means for supplying liquid from the borehole to said fluid system; a reversible electric motor mounted within the housing and having driving connection to the pump; a reversible electric system connected to the motor and extended remotely from the body member for remote control of the motor; a camera mounted within the body member having a field of view exteriorly thereof; a chamber connected to the housing for containing a transparent liquid; electrically actuated means within the housing for removing liquid from the borehole exteriorly of the housing in the field of view of the camera and simultaneously supplanting the thus removed liquid with transparent liquid from the chamber; and an electrical system connected to said liquid removing and supplanting means controlled remotely from the housing.

21. A stepped progression borehole apparatus comprising a pair of elongated substantially cylindrical housings, an extension member connected to one of the housings and slidably telescopically fitted to the opposite housing in substantially axial alignment with both housings for relative axial movement of the housings relative to each other, means connected to one of the housings for lowering the apparatus into a liquid containing borehole, an elastic bladder mounted in circumscribing relation on each of the housings, pump means within one of the housings having an outlet within one of the bladders and an intake open to the borehole for pumping fluid from the borehole into said bladder, electrically actuated reversible pump means mounted within one of the housings having inlet and outlet means interconnecting the bladders whereby fluid is pumped to and from the bladders oppositely and alternately to expand and contract the bladders, and an electrical system connected to the pump means controlled remotely from the housings for independent controlled actuation of said pump means.

22. A stepped progression borehole apparatus comprising a pair of substantially fluid tight hollow housings, an extension member connected to one of the housings and slidably fitted to the opposite housing telescopically interconnecting the housings in substantial alignment for relative movement toward and from each other, means connected to one of the housings for lowering the apparatus into a liquid containing borehole, an elastic bladder mounted in circumscribing relation on each of the housings, a reversible electric motor driven bladder control pump mounted within a housing having opposite alternately inlet and outlet ports, conduits individually interconnecting the opposite ports of the pump with the bladders and adapted to transfer fluid from one bladder to the other thereby alternately and oppositely to expand and to contract the bladders, an electric pump motor having driving connection to the pump, an electric circuit connected to the pump motor having a reversible switch remote from the housings, and a check valve located in the conduit connected between the pump and one of the bladders having a normally closed inwardly operable pressure actuated inlet exposed to fluid in the borehole operable to seal the conduit in which the check valve is located from fluid in the borehole when pressure in such conduit is above the pressure of the borehole fluid and to open for inflow of borehole fluid when the pressure in such conduit is below the borehole fluid pressure.

References Cited in the file of this patent

UNITED STATES PATENTS

| | | |
|---|---|---|
| 556,718 | Semmer | Mar. 17, 1896 |
| 1,658,537 | Reinhold | Feb. 7, 1928 |
| 2,633,783 | Laval | Apr. 7, 1953 |
| 2,667,109 | Piety | Jan. 26, 1954 |